Dec. 13, 1949     C. C. PFLANTZ ET AL     2,491,417
DUMP TRAILER
Filed Jan. 12, 1946                               2 Sheets-Sheet 1
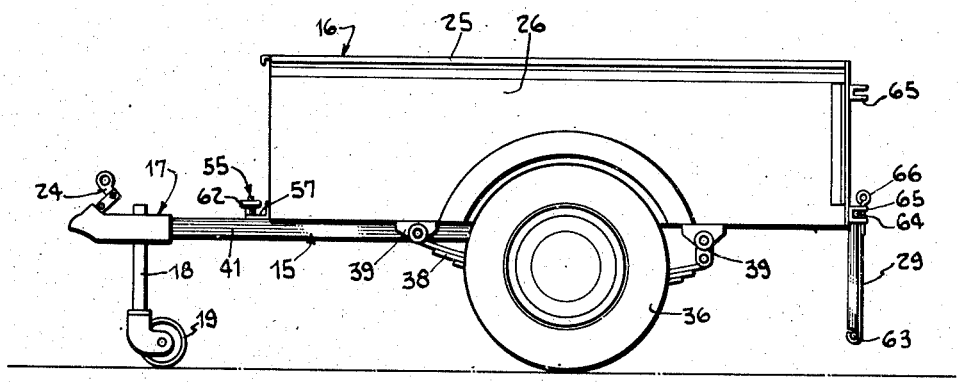
Fig.1
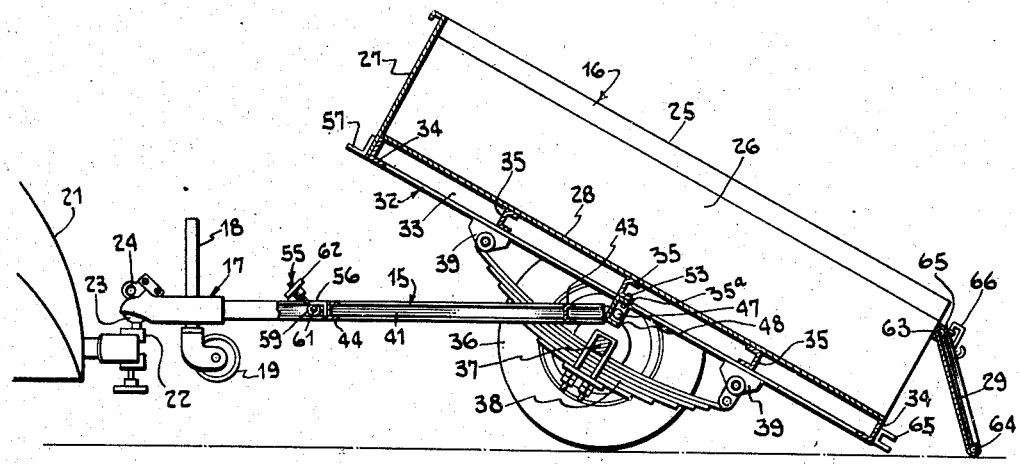
Fig.2
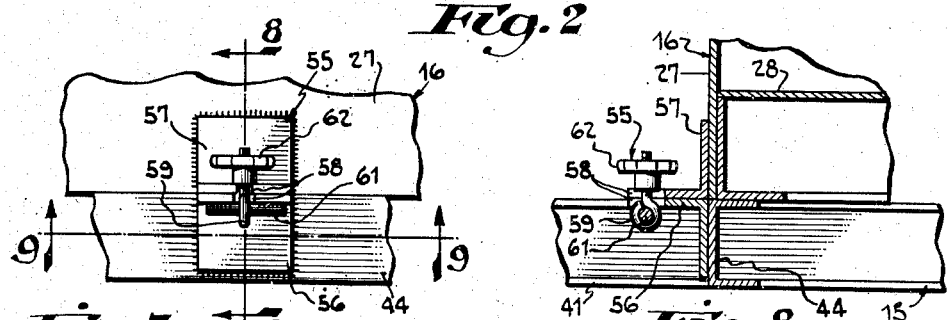
Fig.7            Fig.8
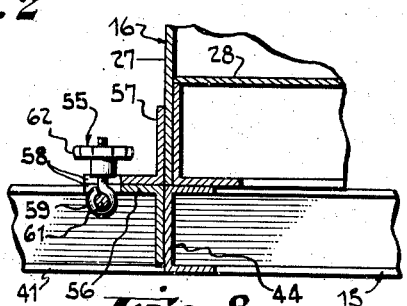
Fig.9
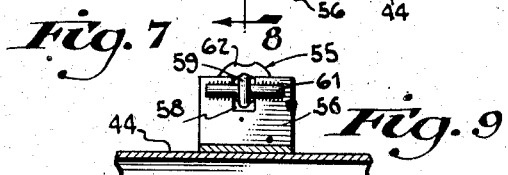
INVENTORS.
Clarence C. Pflantz
BY Howard L. Rabe
Wood, Arey, Herron & Evans
Attorneys.

Dec. 13, 1949     C. C. PFLANTZ ET AL     2,491,417
DUMP TRAILER
Filed Jan. 12, 1946                        2 Sheets-Sheet 2
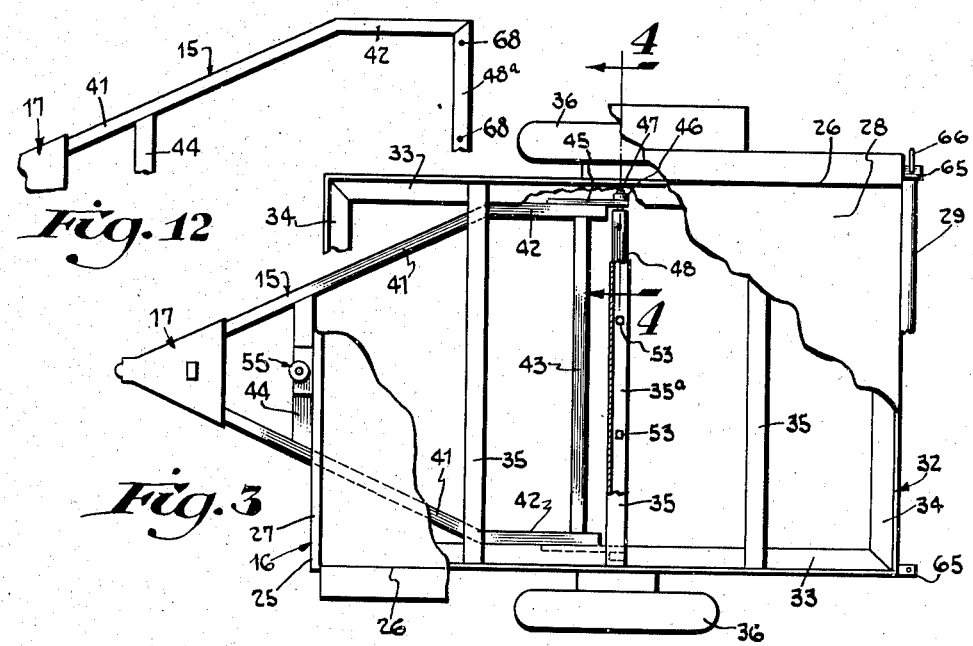
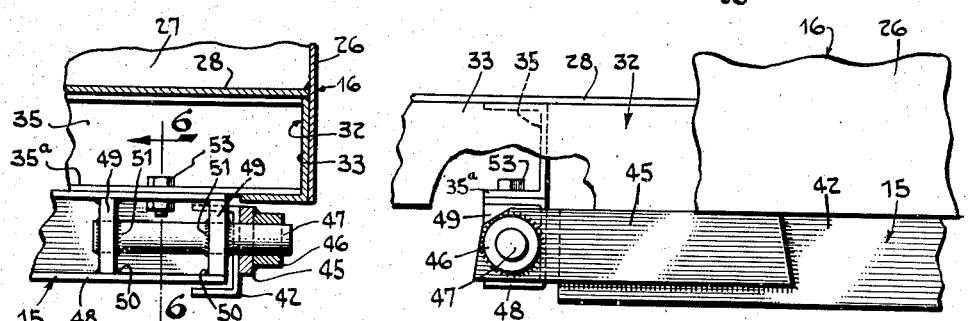
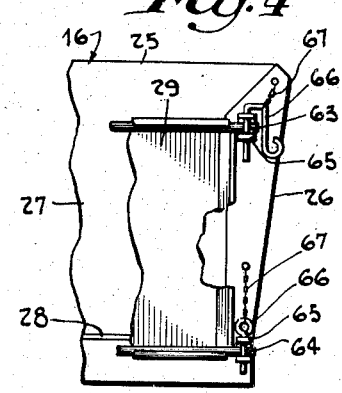
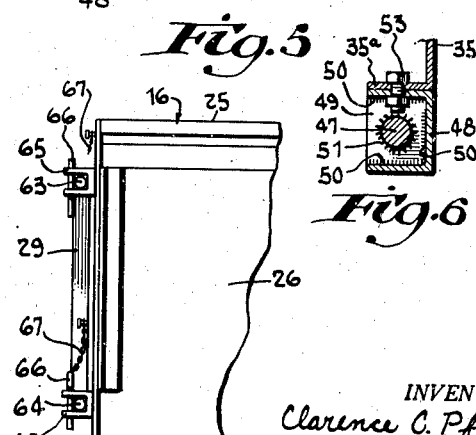
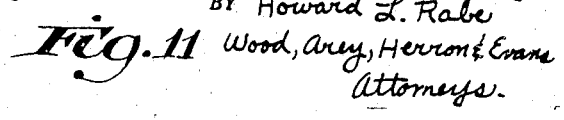

Patented Dec. 13, 1949

2,491,417

UNITED STATES PATENT OFFICE 2,491,417

DUMP TRAILER

Clarence C. Pflantz and Howard L. Rabe, Cincinnati, Ohio, assignors to The Gemco Engineering & Manufacturing Co., Inc., Cincinnati, Ohio, a corporation of Ohio Application January 12, 1946, Serial No. 640,912

4 Claims. (Cl. 298—5)

This invention relates to trailer vehicles and is particularly directed to improvements in a trailer of the two wheel or cart type designed primarily for use with a passenger automobile as a towing vehicle.

More specifically, the present improvements relate to a two wheel trailer having a dump type body and an improved tailgate construction which cooperates with the body in the dumping operation.

Two wheeled trailers of this class are usually coupled to the towing vehicle by means of a draw bar including a coupling element mating with a coupling element mounted upon the towing vehicle, for example a ball and socket connection. This coupling supports the forward end of the trailer and sustains it in a relatively level position while the preponderance of the load is imposed upon the wheels.

When hauling bulk loads such as earth, sand, gravel and the like, it is desirable to unload it by dumping the body, thus saving the time and labor of shoveling or otherwise removing the load by hand. Ordinarily, however, this is not feasible because the loaded trailer is very difficult to uncouple and dump due to the weight of the load, uneven terrain and other factors.

The present improvement permits the trailer body, which is carried upon the wheels in a relatively centrally balanced condition, to be released and dumped in a rapid and convenient manner without uncoupling it from the towing vehicle. In this manner the trailer is under positive control even though the ground or roadway is rough and uneven, or steeply sloped. The structure further incorporates an improved tailgate structure to facilitate dumping the load. Also the tailgate is arranged to be readily removed from the trailer in instances where it interferes with the load. An example of this is in hauling lumber and large objects which extend beyond the rear edge of the trailer.

Briefly, the invention is embodied in a two wheel trailer incorporating a relatively centrally balanced body, which, by the installation of conveniently interchangeable draw bars, can be utilized either as a fixed body trailer or as a dump type trailer without altering the trailer structure.

In order to provide a dump type trailer, a draw bar is installed which, at its point of attachment to the body, incorporates pivotal means which permits the body to be rocked or dumped. A similar interchangeable draw bar is provided for the fixed type trailer, in which instance however, the pivotal means is omitted and the point of attachment to the body is rigid.

Either type of draw bar may be installed in a single, standard trailer design, thus permitting the manufacturer or supplier to furnish either style without being required to carry separate trailer units in stock. This reduces the cost of manufacture, effects a saving in storage space, and a reduction in the inventory of the dealer.

It is therefore an object of the invention to provide a two wheel trailer body which will function either as a dump type or as a fixed type trailer by the application of conveniently installed interchangeable draw bars adapting it to either function.

It is another object to provide a two wheel trailer which may be rapidly and conveniently dumped while coupled to a towing vehicle.

It is a further object to provide a dump type trailer having an improved tailgate construction which permits dumping bulk materials but which may be conveniently removed to facilitate other types of hauling.

Further objects and advantages will be more fully apparent in the description of the accompanying drawings showing a preferred embodiment of the invention in which:

Figure 1 is a side elevation of the trailer showing it in a normal position, uncoupled from the towing vehicle and with the tailgate extended in a position appropriate for loading.

Figure 2 is a longitudinal sectional view showing the trailer coupled to the towing vehicle and showing the trailer body in dumping position with the tailgate swung in a position to facilitate unloading.

Figure 3 is a fragmentary top plan view of the trailer assembly showing portions of the body and frame, and the association of the draw bar assembly therewith.

Figure 4 is an enlarged sectional view taken on line 4—4, Figure 3, detailing the pivotal connection of the draw bar to the trailer frame.

Figure 5 is a side elevation of the assembly shown in Figure 4.

Figure 6 is a sectional view taken on line 6—6, Figure 4.

Figure 7 is an enlarged fragmentary view illustrating the lock mechanism which serves to secure the trailer body in a normal hauling or level position upon the draw bar assembly.

Figure 8 is a sectional view taken on line 8—8, Figure 7.

Figure 9 is a sectional view taken on line 9—9, Figure 7.

Figure 10 is a fragmentary end view of the trailer body showing the tailgate assembly locked in its closed position.

Figure 11 is a fragmentary side elevation further illustrating the tailgate and the latching arrangement therefor.

Figure 12 is a fragmentary view showing an interchangeable fixed draw bar designed for use in place of the dump type draw bar.

Referring to the drawings, particularly to Figures 1, 2 and 3, the draw bar assembly is indicated generally at 15 and the trailer generally at 16. In the preferred embodiment illustrated, the trailer is of the two wheel type, the wheels being located approximately centrally of the length of the body, so that the body rests upon the wheels in generally balanced position with little or no load imposed upon the draw bar.

The forward end of the draw bar assembly includes a coupler unit generally indicated at 17. This unit may be of any preferred commercial style and for this reason it is not described in detail. The coupler may also include an adjustable prop or jack 18 having at its lower end a caster or wheel 19, the prop in its lowered position serving to support the trailer in a level plane upon being uncoupled from the towing vehicle, as shown in Figure 1. This arrangement permits loading and unloading of the trailer uncoupled from the towing vehicle and also facilitates coupling the trailer to the towing vehicle.

As shown in Figure 2, the trailer may be coupled to a towing vehicle 21 by means of a hitch 22 secured to the towing vehicle. The hitch includes a ball 23 which cooperates with a socket as part of the coupling unit 17, thus providing a ball and socket connection between the towing vehicle and the trailer in the usual manner. As shown, the prop 18 is raised to an inoperative position upon coupling of the trailer to the towing vehicle.

The coupling unit is provided with a locking device 24 which may be of any approved construction. This device serves to lock the ball 23 securely within the socket, and to prevent its withdrawal. Safety means in the form of chain couplings (not shown) between the tow car and trailer may be provided if desired. These chains provide an auxiliary coupling to prevent damage should the ball and socket coupling fail while the vehicles are in motion.

The trailer itself comprises a rectangular body 25, preferably of sheet metal. This body may include opposite side walls 26—26, a forward end wall 27 and a floor 28. The rear end of the body may be open and may be provided with a tailgate 29 hereinafter described.

The body is preferably mounted upon a rectangular frame generally indicated at 32. This frame comprises angle iron members 33 and 34 constituting side and end rails respectively, these being mitered and joined by welding at the corners. The frame additionally includes transverse channel members 35 which serve to stiffen the frame and provide support for the floor 28.

The respective side and end walls of the body are secured to the exterior side of the vertical portions of the respective angle iron members 33 and 34, as shown in Figures 2 and 4. The walls may be secured to the angle iron by welding or other means, and as shown, preferably overlie and conceal the frame. The floor 28 rests upon the top surface of the transverse channels 35 and is welded or otherwise secured to them and likewise may be fillet welded along its juncture with the side and end walls.

As shown in Figures 1, 2 and 3, the trailer is carried upon rubber tired automotive type wheels 36—36 located approximately at the longitudinal center of the body. These wheels are mounted upon an axle 37 which in turn carries a pair of underslung springs 38 secured one at each end thereof. The respective opposite ends of each spring are anchored in the usual manner in spring shackles 39—39 secured to the underside of the frame 32.

The pivotal draw bar assembly 15 comprises a pair of channel irons 41—41 joined together at their forward ends by means of the coupler unit 17. The channel irons diverge rearwardly toward opposite sides of the trailer and terminate with parallel rearward portions 42—42 disposed within the inner margins of the angle iron members 33—33 of the frame 32. A transverse channel iron member 43 is rigidly secured to the respective parallel portions 42 by welding or other means and serves to hold this portion of the draw bar in spaced relationship. A second transverse channel iron 44 spans across the diverging portions 41—41 for the purpose hereinafter disclosed.

A pivotal connection is made between the rear end of the draw bar and the trailer to permit the trailer to be tilted rearwardly for dumping without uncoupling it from the towing vehicle, as shown in Figure 2. For this purpose the respective rearward portions 42—42 of the draw bar, each includes a bearing bracket 45 welded or otherwise secured thereto. Each of these brackets includes a bushing 46 welded or otherwise secured to the bracket, the bushing and bracket being drilled and reamed in assembly to provide bearings for trunnion shafts 47—47.

As shown in Figures 4, 5 and 6, the trunnion shafts are secured to the respective opposite ends of a transverse channel iron 48, a pair of blocks 49—49 being provided at each end for this purpose. These blocks are dimensioned to fit within the webs of the channel iron to be welded thereto along three sides as indicated at 50 and each block is drilled to receive the trunnion shaft. The shaft is welded in place to the respective blocks as at 51.

Because of the construction described, the trunnion shafts are rigidly secured to the opposite ends of the channel iron 48 and are in effect integral therewith. Since the trunnion shafts are loosely journalled in the bearing brackets 45, which are rigidly secured to the draw bar, the channel iron 48 is free to rock with respect to the draw bar.

As shown in Figures 4 to 6 inclusive, the channel 48 is secured to one of the transverse channel irons 35 forming a part of the trailer frame 32. This channel is located approximately at a central or intermediate point lengthwise of the trailer and approximately in a line with the center of the wheels.

For purposes of attachment, the lower web 35a of the channel 35 includes a series of holes located to match a series of similar holes in the upper web of the loosely mounted draw bar channel 48. The respective channels 35 and 48 are rigidly secured together by means of a plurality of bolts and nuts 53 located in these holes.

By virtue of the arrangement described, the trailer body is free to be rocked or tilted rearwardly for dumping without uncoupling the draw bar from the towing vehicle as the channel 48, being free to rock, pivots in its bearings when the trailer body is tilted. In towing the vehicle, the tractive force is transmitted through the draw bar to the bearing brackets 45—45 and through the trunnion shafts 47—47 to the rocking channel 48 which in turn is secured to the trailer frame.

The draw bar assembly as above described is designed for use interchangeably with a non-dumping trailer, that is, an assembly in which the draw bar is rigidly secured to the trailer. In this form the draw bar is of an identical construction with the exception that the trunnion shafts 47 are eliminated and the rocking channel 48 is rigidly secured to the draw bar in the same position as before as shown in Figure 12. In this instance the rigid channel 48a, as shown, includes a series of holes 68 identical with those of the loosely mounted channel 48, matching the holes in the channel 35. The rigid channel is thus installed interchangeably with the loose channel and secured by the bolts and nuts 53 to the channel 35 in the same manner as the loose channel.

In each instance whether a fixed or a dump trailer, the construction of the trailer is identical. Accordingly, the manufacturer or dealer is able to furnish either type of trailer upon request by bolting on the appropriate draw bar, this being a relatively simple operation.

A locking device generally indicated at 55 is located at the front of the trailer. This is in the form of a latch for securing the trailer rigidly to the draw bar in a normal level position and can be released to permit dumping as shown in Figure 2. As shown in Figures 7 to 9 inclusive, the device comprises a pair of angle irons 56 and 57 secured respectively to the transverse channel iron 44 of the draw bar and to the front wall 27 of the trailer body. The horizontal webs of the angle irons are positioned to rest one upon the other and each web includes a slot 58 to accommodate an eye bolt 59. The eye bolt is loosely pivoted to the lower angle iron 56 upon a pin 61 welded to the under side of the horizontal web. The upper or free end of the eye bolt carries a hand nut 62 in screw threaded engagement thereon.

In the locking position as shown in Figure 8, the bolt is swung to a vertical position and the hand nut is screwed down upon the web of the angle iron 57, thus clamping it securely to the angle iron 56 and locking the trailer to the draw bar in a level position. When it is desired to dump the trailer, as shown in Figure 2, the hand nut is unscrewed permitting the eye bolt to swing clear of the angle iron 57, thereby permitting the trailer to be tilted.

In order to facilitate dumping, the tailgate 29 is arranged to be swung either from its top or bottom edge as desired. For this purpose the tailgate includes upper and lower hinge pins 63 and 64, respectively extending outwardly from opposite sides at the top and bottom thereof as shown in Figures 10 and 11. Two sets of upper and lower bifurcated lugs or shackles 65 are secured to the trailer at the rear thereof to receive and straddle the hinge pins. The hinge pins are locked in place in the respective lugs by means of removable latch pins 66 which are slipped into holes drilled in the lugs for this purpose.

When both upper and lower sets of latch pins 66 are in place as shown in Figure 10, the tailgate is securely locked in closed position. If the upper set of latch pins is removed the tailgate is free to swing from its lower edge, as shown in Figure 1, to facilitate loading and unloading. Upon removal of the lower set of latch pins with the upper pins in place, the tailgate swings from its upper edge as shown in Figure 2. In this relationship the tailgate expedites the dumping function of the trailer especially with respect to bulk materials such as sand, gravel, etc.

In order to prevent loss or displacement of the latching pins 66 at such times as they are removed from the lugs 65, the pins are secured to the trailer body by means of the chains 67 as shown in Figures 10 and 11.

If desired, the tailgate may be removed entirely from the trailer by removal of both sets of latching pins 66. This may be of advantage in hauling lumber or bulky objects such as furniture and the like where it may be necessary to permit part of the load to extend beyond the rear edge of the trailer.

It will be evident that the present trailer structure provides a convenient and quickly operable assembly. In hauling bulk materials the load may be readily dumped without uncoupling from the towing vehicle by disengaging the hand nut 62 and removing the lower set of latching pins 66 from the tailgate. Since the load is carried approximately in balance it is a relatively easy task to tilt the trailer body and dump the load.

The tailgate arrangement as shown and described is applicable to the trailer either as a dump body or as a fixed body as it is advantageous in both instances and further because it is desirable to utilize the identical body for either installation in the interest of interchangeability.

Having described our invention, we claim:

1. In a trailer vehicle having, a pair of wheels, a body mounted upon said wheels, a draw bar comprising: a pair of spaced longitudinal side rails having coupling means at the forward end thereof adapted to cooperate with coupling means carried by a towing vehicle, a bearing mounted at the rearward end of each of said side rails, a transverse mounting rail, said rail being journalled at opposite ends in said bearings, and means on said trailer body for securing said mounting rail thereto.

2. A trailer vehicle comprising; a pair of wheels, a trailer body mounted on said wheels, a draw bar formed of a pair of side rails disposed in V formation and having substantially parallel rearward extensions to provide a pair of spaced longitudinal rails forming a sub-frame for the trailer body, bearings secured to the rearward extensions of said side rails, a cross beam having trunnion journals secured at opposite ends thereof, said trailer body having a cross rail in registry with said transverse rail and including means for detachably securing the trailer body cross rail to said pivotally mounted draw bar cross rail.

3. A trailer vehicle comprising; a pair of wheels, a trailer body mounted on said wheels, a draw bar formed of a pair of side rails disposed in V formation and having substantially parallel rearward extensions to provide a pair of spaced longitudinal rails beneath the trailer body, bearing blocks secured to the rearward extensions of said side rails, a cross beam having trunnion journals secured thereto journalled in said bearings, said trailer body having a cross rail in registry with said transverse rail and including means for detachably securing the trailer body cross rail to said pivotally mounted draw bar cross rail, and means for clamping the forward end of said trailer body to said draw bar to provide a three point connection therebetween.

4. A trailer vehicle comprising; a pair of wheels, a trailer body mounted on said wheels, a draw bar formed of a pair of side rails, disposed in V formation and having substantially parallel rearward extensions to provide a pair of spaced longitudinal rails beneath the trailer body, bearing blocks secured to the rearward extensions of said side rails, a cross beam having trunnion journals pivotally journalled in said bearings, and having a series of apertures, said trailer body having a cross rail in registry with said cross rail and including a series of apertures matching the series of apertures in said pivotally mounted cross rail, and a series of bolts extending through said matching apertures for detachably securing the trailer body cross rail to said pivotally mounted draw bar cross rail.

CLARENCE C. PFLANTZ.
HOWARD L. RABE.

REFERENCES CITED

The following references are of record in the file of this patent:

UNITED STATES PATENTS

| Number | Name | Date |
| --- | --- | --- |
| 1,265,705 | Litchfield | May 7, 1918 |
| 1,305,995 | Drew | June 10, 1919 |
| 1,790,379 | Hughes | Jan. 27, 1931 |
| 1,828,797 | Becker | Oct. 27, 1931 |
| 2,009,548 | Goin et al. | July 30, 1935 |
| 2,062,233 | Poirier | Nov. 24, 1936 |
| 2,113,262 | Zagelmeyer | Apr. 5, 1938 |
| 2,182,077 | Feigelson | Dec. 5, 1939 |